United States Patent
Betzel et al.

(10) Patent No.: US 11,698,927 B2
(45) Date of Patent: Jul. 11, 2023

(54) CONTEXTUAL DIGITAL MEDIA PROCESSING SYSTEMS AND METHODS

(71) Applicant: Sony Interactive Entertainment LLC, San Mateo, CA (US)

(72) Inventors: Michael W. Betzel, Madison, WI (US); Zachary Tyler Wernberg, Madison, WI (US); Shawn Michael McCray, Middleton, WI (US); Alex J. Schwartz, Middleton, WI (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 180 days.

(21) Appl. No.: 15/981,699

(22) Filed: May 16, 2018

(65) Prior Publication Data

US 2019/0351331 A1 Nov. 21, 2019

(51) Int. Cl.
*G06F 16/74* (2019.01)
*G06F 16/40* (2019.01)
*G06F 16/78* (2019.01)

(52) U.S. Cl.
CPC .............. *G06F 16/74* (2019.01); *G06F 16/40* (2019.01); *G06F 16/78* (2019.01)

(58) Field of Classification Search
CPC ........... G06F 16/40; G06F 16/74; G06F 16/78
USPC ........................................................ 707/776
See application file for complete search history.

(56) References Cited

U.S. PATENT DOCUMENTS

| | | | |
|---|---|---|---|
| 4,677,569 A | 6/1987 | Nakano et al. | |
| 4,757,525 A | 7/1988 | Matthews et al. | |
| 5,274,560 A | 12/1993 | LaRue | |
| 5,446,714 A | 8/1995 | Yoshio et al. | |
| 5,617,407 A | 4/1997 | Bareis | |
| 5,890,122 A | 3/1999 | Van Kleeck et al. | |
| 6,155,924 A | 12/2000 | Nakagawa et al. | |
| 6,366,272 B1 | 4/2002 | Rosenberg et al. | |
| 6,456,977 B1 | 9/2002 | Wang | |
| 6,529,875 B1 | 3/2003 | Nakajima et al. | |
| 6,538,666 B1 | 3/2003 | Ozawa et al. | |
| 6,554,707 B1 | 4/2003 | Sinclair et al. | |
| 6,571,208 B1 | 5/2003 | Kuhn et al. | |

(Continued)

FOREIGN PATENT DOCUMENTS

| | | |
|---|---|---|
| CN | 1201180 A | 12/1998 |
| CN | 112602077 A | 4/2021 |

(Continued)

OTHER PUBLICATIONS

International Search Report dated Jul. 8, 2019 in PCT Application No. PCT/US2019/025543, 11 pages.

(Continued)

*Primary Examiner* — Sherief Badawi
*Assistant Examiner* — Jessica N Le
(74) *Attorney, Agent, or Firm* — Carr & Ferrell LLP

(57) ABSTRACT

Systems and methods for contextual digital media processing are disclosed herein. An example method includes receiving content from a source as digital media that are being displayed to a user, processing the digital media to determine contextual information within the content, searching at least one network for supplementary content based on the determined contextual information, and transmitting the supplementary content for use with at least one of the source or a receiving device.

20 Claims, 9 Drawing Sheets

(56) References Cited

U.S. PATENT DOCUMENTS

| | | | |
|---|---|---|---|
| 6,585,599 B1 | 7/2003 | Horigami et al. | |
| 6,928,433 B2 | 8/2005 | Goodman et al. | |
| 7,085,722 B2 | 8/2006 | Luisi | |
| 7,233,904 B2 | 6/2007 | Luisi | |
| 7,251,315 B1 | 7/2007 | Quinton | |
| 7,877,262 B2 | 1/2011 | Luisi | |
| 8,522,289 B2* | 8/2013 | Athsani | H04N 21/21805 725/87 |
| 8,843,470 B2 | 9/2014 | Li et al. | |
| 9,471,852 B1* | 10/2016 | Feris | G06N 3/08 |
| 11,122,341 B1* | 9/2021 | Decrop | H04N 21/44008 |
| 11,266,916 B2* | 3/2022 | Benedetto | A63F 13/497 |
| 2002/0068626 A1 | 6/2002 | Takeda et al. | |
| 2005/0220439 A1 | 10/2005 | Carton et al. | |
| 2007/0197247 A1* | 8/2007 | Inselberg | G06Q 30/02 455/517 |
| 2007/0250901 A1* | 10/2007 | McIntire | G11B 27/28 348/E7.071 |
| 2008/0109306 A1* | 5/2008 | Maigret | G06Q 30/0277 705/14.46 |
| 2008/0288641 A1 | 11/2008 | Messer et al. | |
| 2009/0328113 A1 | 12/2009 | van de Klashorst | |
| 2010/0029387 A1 | 2/2010 | Luisi | |
| 2010/0046842 A1 | 2/2010 | Conwell | |
| 2010/0158099 A1 | 6/2010 | Kalva et al. | |
| 2010/0250136 A1* | 9/2010 | Chen | H04W 64/00 701/300 |
| 2010/0273553 A1 | 10/2010 | Zalewski | |
| 2010/0306402 A1* | 12/2010 | Russell | A63F 13/12 709/231 |
| 2011/0123115 A1* | 5/2011 | Lee | G06K 9/325 382/185 |
| 2011/0247042 A1* | 10/2011 | Mallinson | G06K 9/00758 725/86 |
| 2011/0281648 A1 | 11/2011 | Weising | |
| 2011/0282906 A1* | 11/2011 | Wong | G06F 16/7867 707/780 |
| 2011/0314049 A1* | 12/2011 | Poirier | H04N 1/00183 707/769 |
| 2012/0079380 A1* | 3/2012 | Tsai | G06F 16/40 715/716 |
| 2012/0095958 A1 | 4/2012 | Pereira et al. | |
| 2012/0278080 A1 | 11/2012 | Singh et al. | |
| 2013/0086051 A1* | 4/2013 | Brahms | G06F 16/13 707/723 |
| 2013/0155229 A1* | 6/2013 | Thornton | G06V 20/52 348/143 |
| 2013/0159298 A1* | 6/2013 | Mason | G06F 16/9535 707/728 |
| 2013/0282747 A1 | 10/2013 | Cheng et al. | |
| 2013/0336520 A1 | 12/2013 | Vanhoucke et al. | |
| 2013/0344952 A1 | 12/2013 | Dharmapurikar | |
| 2014/0281004 A1* | 9/2014 | Bridges | H04N 21/4622 709/231 |
| 2014/0328570 A1* | 11/2014 | Cheng | H04N 21/44008 386/241 |
| 2015/0067505 A1* | 3/2015 | Metcalf | G06F 16/958 715/716 |
| 2015/0082349 A1 | 3/2015 | Ishtiaq et al. | |
| 2015/0213362 A1* | 7/2015 | Ohwa | G06N 5/04 706/46 |
| 2015/0279426 A1 | 10/2015 | Maurer et al. | |
| 2015/0371448 A1 | 12/2015 | Mullins | |
| 2016/0042251 A1 | 2/2016 | Cordova-Diba et al. | |
| 2016/0092561 A1* | 3/2016 | Liu | G06F 16/739 386/230 |
| 2016/0253429 A1* | 9/2016 | Banti | G06Q 30/0241 707/706 |
| 2016/0317933 A1 | 11/2016 | Shoshan | |
| 2016/0378790 A1* | 12/2016 | Besehanic | G06K 9/325 707/706 |
| 2016/0381291 A1* | 12/2016 | Han | G06T 11/60 348/39 |
| 2017/0351417 A1 | 12/2017 | Manico et al. | |
| 2018/0041750 A1* | 2/2018 | Kim | G06T 15/20 |
| 2018/0132011 A1* | 5/2018 | Shichman | G11B 27/28 |
| 2018/0176660 A1* | 6/2018 | Lentzitzky | H04N 21/4394 |
| 2018/0181832 A1* | 6/2018 | Wu | G06Q 10/10 |
| 2018/0232602 A1* | 8/2018 | Dey | G06F 16/5854 |
| 2018/0267994 A1* | 9/2018 | Badr | G06K 9/72 |
| 2018/0336415 A1* | 11/2018 | Anorga | G06N 3/0454 |
| 2018/0349687 A1* | 12/2018 | Bostick | G06V 40/20 |
| 2019/0122069 A1* | 4/2019 | Nayyar | G06K 9/6201 |
| 2019/0163975 A1* | 5/2019 | Desai | G06K 9/00671 |
| 2019/0373322 A1 | 12/2019 | Rojas-Echenique et al. | |

FOREIGN PATENT DOCUMENTS

| | | |
|---|---|---|
| CN | 112639759 A | 4/2021 |
| DE | 19905076 A1 | 5/2000 |
| EP | 0789296 A1 | 8/1997 |
| EP | 0850673 A1 | 7/1998 |
| EP | 3794455 A1 | 3/2021 |
| GB | 2351637 A | 1/2001 |
| JP | H09265379 A | 10/1997 |
| JP | H11070273 A | 3/1999 |
| JP | 2000338993 A | 12/2000 |
| JP | 2001029649 A | 2/2001 |
| JP | 2017142846 A | 8/2017 |
| JP | 2021523480 A | 9/2021 |
| KR | 20000072753 A | 12/2000 |
| KR | 1020120127571 | 11/2012 |
| KR | 1020210013588 A | 2/2021 |
| WO | WO1998002223 A1 | 1/1998 |
| WO | WO2019221834 A1 | 11/2019 |
| WO | WO2019231559 A1 | 12/2019 |

OTHER PUBLICATIONS

Sünderhauf, Niko et al., "Place Recognition with ConvNet Landmarks: Viewpoint-Robus, Condition-Robust, Training-Free," Proceedings of Robotics: Sysence and Systems (RSS) vol. XII, 2015 [retrieved on Jul. 8, 2019], Retrieved from the Internet: <URL:https://eprints.qut.edu.au/84931/1/rss15_placeRec.pdf>, 12 pages.

"International Search Report" and "Written Opinion of the International Searching Authority," Patent Cooperation Treaty Application No. PCT/US2019/025638, Jul. 10, 2019, 8 pages.

Aguilera et al. "Impaired Persons Facilities Based on a Multi-Modality Speech Processing System." In Proceedings on Speech & Language Technology, 1993. 4 pages.

Arons, B. "Authoring and Transcription Tools for Speech-Based Hypermedia." In Proceedings of American Voice I/O Society, 1991. 5 pages.

Arons, B. "Hyperspeech: Navigating in Speech-Only Hypermedia." In Proceedings of the Third Annual ACM Conference on Hypertext, ACM, 1991. pp. 133-146.

Bennacef, S.K. "A Spoken Language System for Information Retrieval." In ICSLP, vol. 94, pp. 1271-1274. 1994. 4 pages.

Gauvain et al. "Speech recognition for an Information Kiosk." In Spoken Language, 1996. ICSLP 96. Proceedings. Fourth International Conference on, vol. 2, pp. 849-852. IEEE, 1996.

Gauvain et al. "Spoken Language Component of the MASK Kiosk." In Human Comfort and Security of Information Systems, pp. 93-103. Springer Berlin Heidelberg, 1997. 11 pages.

Gauvain et al. "The LIMSI Continuous Speech Dictation System." In Proceedings of the Workshop on Human Language Technology, pp. 319-324. Association for Computational Linguistics, Apr. 1994. 6 pages.

Gauvain et al. "The LIMSI Continuous Speech Dictation System: Evaluation on the ARPA Wall Street Journal Task." In Acoustics, Speech, and Signal Processing, 1994. ICASSP-94., 1994 IEEE International Conference on, vol. 1, IEEE, 1994, 4 pp.

Goddeau et al. "Galaxy: A Human-Language Interface to On-Line Travel Information." In Third International Conference on Spoken Language Processing. 1994, pp. 707-710.

House, D. "Spoken-Language Access to Multimedia (SLAM): Masters Thesis." Oregon Graduate Inst., Dept. of CS and Eng., 1995. 59 pages.

(56) References Cited

OTHER PUBLICATIONS

Lamel et al. "Recent Developments in Spoken Language Systems for Information Retrieval." In Spoken Dialogue Systems—Theories and Applications. 1995, 4 pages.
Language Industry Monitor, "Janet Baker's Optimism." 1992. [retrieved on Oct. 25, 2011], Retrieved from the Internet: <URL: http://www.lim.nl/monitor/dragon.html>, 2 pages.
Mostow et al. "Towards a Reading Coach That Listens: Automated Detection of Oral Reading Errors." Proc. of the 11th Ntl. Conf. on A.I., 1993, pp. 392-397.
Russell et al. "Applications of Automatic Speech Recognition to Speech and Language Development in Young Children." In Fourth International Conference on Spoken Language, 1996. ICSLP 96. vol. 1, pp. 176-179. IEEE, 1996. 4 pages.
"Extended European Search Report", European Patent Application No. 19803478.7, dated Dec. 3, 2021, 10 pages.
Suenderhaug et al., "Place Recognition with ConvNet Landmarks: Viewpoint-Robust, Condition-Robust, Training-Free," In Hsu, D (Ed.) Robotics: Science and Systems XI, <downloaded from https://eprints.qut.edu.au/84931/>11 pages. 2015.

\* cited by examiner

CONTEXTUAL DIGITAL MEDIA PROCESSING SYSTEMS AND METHODS

FIELD

The present technology is directed to systems and methods that contextually process digital media in order to provide enhanced displays of the digital media with supplementary content in an overlay or through augmented reality.

SUMMARY

According to various embodiments, the present technology is directed to a method comprising: (a) receiving content from a source as digital media that are being displayed to a user; (b) processing the digital media to determine contextual information within the content; (c) searching at least one network for supplementary content based on the determined contextual information; and (d) transmitting the supplementary content for use with at least one of the source or a receiving device.

According to various embodiments, the present technology is directed to a method comprising: (a) receiving live content from a gaming console as images or video that is being displayed to a user; (b) processing the images or video in real-time to determine contextual information within the content using a plurality of contextual information sources comprising any of optical character recognition to detect keywords or phrases, a reverse image search using a search engine for related images, and scene and landmark detection using machine learning to recognize features in the images; (c) storing most recent contextual information processed for the live content in real-time, the most recent contextual information being stored in memory of a contextual repository, wherein the most recent contextual information changes as the images or video changes; (d) searching the Internet for third-party supplementary content based on the contextual information; and (e) transmitting, in real-time, the third-party supplementary content for use with at least one of the source or a receiving device.

According to various embodiments, the present technology is directed to a system comprising: (a) a data collection and analysis system configured to: (i) receive content from a source as images or video; (ii) obtain contextual information by processing the images or video using a plurality of contextual information sources comprising any of optical character recognition to detect keywords or phrases, a reverse image search using a search engine for related images, and scene and landmark detection using machine learning to recognize features in the images; (iii) search at least one network for supplementary content based on the contextual information; and (iv) transmit the supplementary content for use with at least one of the source or a receiving device; and (b) a contextual repository configured to store the content, the contextual information, and the supplementary content.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
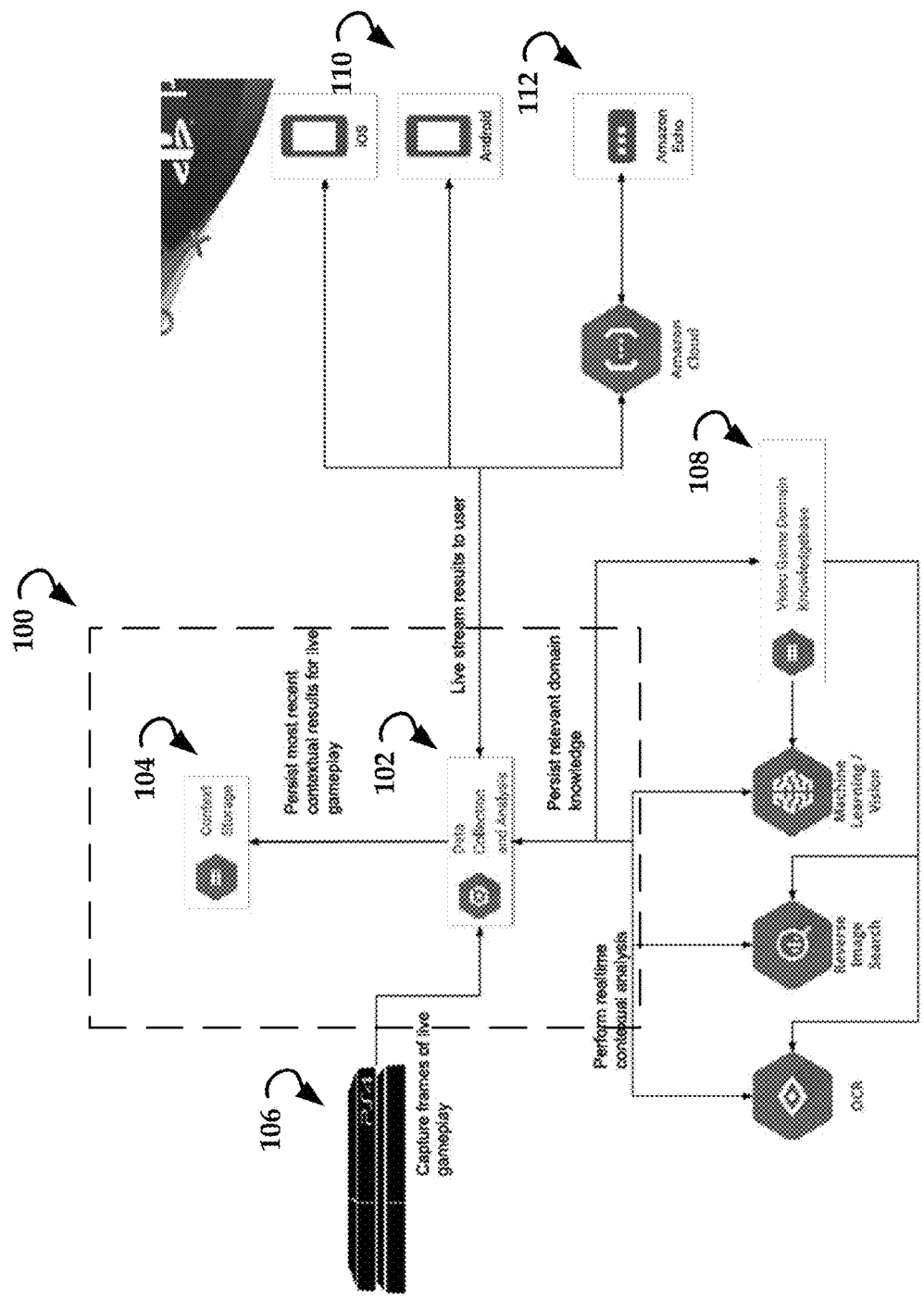
FIG. 1 is a schematic diagram of an example system for practicing aspects of the present technology.

The present disclosure relates generally to systems and methods that allow for automated contextual analysis of media, such as images or video, to uncover contextual information therein, as well as the use of the contextual information as the input for a search (such as an Internet search) for supplementary content related to the media.

The systems and methods disclosed herein can compile raw data from a variety of sources and weigh the results based on confidence scoring and commonalities across the data sources. These systems and methods can perform real-time Internet searches for supplementary content based on the strongest (most relevant) contextual results. If found, the supplementary content can be used to augment the display of the currently displayed media using an overlay within the display. Other alternative options for displaying the supplementary content can be utilized (such as transmitting the supplementary content to a mobile device, as will be described in greater detail infra).

In more detail, in some embodiments, the present disclosure is directed to systems and methods that capture real-time or live media such as a video game output generated by a gaming console. Other examples of input include, but are not limited to, video output generated by a television, a computer, a set-top box, or any OTT (over the top) or OTB (on the box) device—just to name a few. As noted above, the media can include, for example, any type of images or video and frames captured therefrom.

The most recent portions of the live media can be stored in a buffer of a storage repository in cache or other temporary storage. For example, in some embodiments, one or more minutes of live media are obtained from a gaming console and processed for contextual information and stored in temporary storage. The temporary storage is continually updated as more recent live media is generated by the gaming console.

Contextual information is extracted from the live media using at least one of a plurality of means such as optical character recognition, reverse image searching, and feature determination through use of artificial intelligence (e.g., scene and landmark detection) in the live media such as players, landmarks, and so forth.

The contextual information extracted from the live media can be used as input to a search in order to locate supplementary content. Prior to searching, the contextual information extracted from the live media can be evaluated for relevancy. In general, contextual information can be evaluated using confidence scores and commonality calculated across the plurality of contextual information sources. In some instances, contextual information can also be weighted according to the confidence scores to improve search terms, and ultimately, results.

As noted above, the supplementary content located through the search is generally described as content that is related to the live media, specifically selected based on its contextual relevancy. In one example, the supplementary content includes reference content related to a video game. In use, as a user is playing a video game on a gaming console (or other device), an output of the video game is processed for contextual information. This contextual information is used to search for supplementary content through Internet searching. If reference content is found, an overlay for the video game is created and displayed by the console in a graphical user interface (GUI). In some embodiments, the GUI includes the supplementary content in the form of links or videos, although these examples are clearly non-limiting in nature. As such, in some embodiments, the user can thus access tutorials, help-guides, and other supplementary content on the GUI in an in-game environment. In another example embodiment, the GUI is provided through an application that resides on a mobile device so that the user can consult their mobile device and not obscure gameplay. In yet other embodiments, the GUI can be provided as augmented reality overlays when the gaming console includes virtual reality hardware, such as a headset. Thus, user equipment disclosed herein can include VR hardware such as a headset and controllers.

In sum, the present disclosure uses systems and methods that allow for real-time analysis of video game play from a gaming console in order to provide a user with supplementary content related to the video game they are playing. In some instances, the supplementary content is continually updated as the user moves throughout the game.

In some embodiments, the contextual information and/or supplementary content can be categorized and stored along with the live media in a knowledgebase or other repository. Therefore, rather than relying entirely on network (e.g., Internet) searches, the knowledgebase can be consulted in addition to, or in lieu of, network searching.

These and other advantages of the present disclosure are provided in greater detail herein with reference to the collective drawings.

FIG. 1 is a schematic diagram of an embodiment of a system 100 constructed and configured in accordance with the present disclosure. In some embodiments, the system 100 generally includes a data collection and analysis system 102, a contextual repository 104, and optionally a knowledgebase 108. The system 100 can include additional components in other embodiments. For example, the system 100 can also comprise a source 106 such as a gaming console or other computing device that provides an output of media. In some embodiments, the functions of the data collection and analysis system 102 and the contextual repository 104 can be integrated into the source 106 rather than provided in the distributed manner illustrated in FIG. 1, although the distributed embodiment of FIG. 1 allows for the creation of the knowledgebase and/or cooperative use of the UEs as disclosed below.

User equipment (UE) such as UE 110 can include, for example, a mobile device that is executing a particular operating system such as iOS or Android. A client-side application resides on the UE 110 (see FIG. 4) and allows the UE 110 to communicate with the system 100. In another example, a UE 112 could include a voice response or home automation device that receives natural language requests and provides responses to users. In one example embodiment, these devices can be used to receive natural language queries from users about the live media and the system 100 can generate a GUI in response that comprises supplementary content. For example, the user can utilize the UE 110 by speaking a phrase such as "I need help with this level." The data collection and analysis system 102 can receive this request and initialize the contextual analysis and supplementary content delivery processes based on this request. In other embodiments, the contextual processing is automatically activated when a client-side application in communication with the data collection and analysis system 102 is active and when gameplay is occurring.

In some embodiments, the data collection and analysis system 102 receives content in the form of media, such as images and/or video. In various embodiments, media is received from a source 106 in the form of a video stream of a gaming console. In some embodiments, the data collection and analysis system 102 can deploy an agent or daemon on the source 106 to collect frames of video game play in real time. In another embodiment, the source 106 can transmit frames to the data collection and analysis system 102 from a video clip buffer on the source 106 or frames can be captured at the graphics processing unit (GPU) level of the source 106.

In some embodiments, the data collection and analysis system 102 is configured to process or analyze the media received from the source 106 using one or more of a plurality of contextual analysis processes. In one or more embodiments, the data collection and analysis system 102 is configured to perform optical character recognition on frames of the media in order to identify keywords or phrases found in the frames. By way of example, a user is playing a game on the source 106 and an initial application (e.g., client-side application) is blank with no information. As the data collection and analysis system 102 performs live gameplay analysis, the client-side application updates in real-time with supplementary content. In one example, initially, the client-side application determines the game the user is playing and then the client-side application determines the current level being played and loads guides and videos related to that level on a frame that is proximate or overlaid on the game display as a GUI. To be sure, example screenshots of these steps are illustrated and in greater detail infra. The user is able to browse the provided links in the GUI and watch videos provided on the application, such as a level-specific wiki.

In some instances, the data collection and analysis system 102 is configured to utilize reverse image searching through a search engine in order to search for data that is similar to what is contained in the frames. In additional embodiments, the data collection and analysis system 102 is alternatively or additionally configured to utilize machine learning in order to process the frames and identify landmarks or other discrete features in the frames. Each of the examples provided enables the data collection and analysis system 102 to find contextual information in the frames. In general, contextual information comprises any quantifiable information in a frame that identifies, for example, a domain (e.g., subject matter), level, objects, characters, location, position, and so forth in a video game.

In one embodiment, the data collection and analysis system 102 determines that the user is playing a recognizable boss battle. The data collection and analysis system 102 will feed the reverse image search data back to the UE 110 or source 106. In general, the data collection and analysis system 102 performs a reverse image search on live frames captured from the game and then returns general information on the game first. As the user plays and the data collection and analysis system 102 detects the user is battling Chaos Witch Quelaag (an example of detecting present gameplay context), the data collection and analysis system 102 returns specific links related to that boss battle as results of a search query on a search engine.

In one embodiment, the data collection and analysis system 102 detects the game being played and determines there are cars in a scene. After analysis, the data collection and analysis system 102 provides links to useful video locations. In another example, the data collection and analysis system 102 successfully identifies a landmark in the 3D virtual environment and then identifies relevant videos and links and/or wiki pages related to these landmarks.

To be sure, the present disclosure is not limited to video games and the contextual information available for other media types is dependent on the media content itself. For example, in a movie, contextual information could be related to locations in the movie, characters, and other similar data. By way of non-limiting example, the data collection and analysis system 102 could be used to evaluate a scene in a movie and provide the viewer with interesting facts about the movie or the content included on the screen, such as information about the location of a scene.

In some embodiments, each of a series of frames can be timestamped and processed to generate a batch of contextual information over a timeframe having a starting point and ending point.

Extracted contextual information is processed, in some embodiments, by the data collection and analysis system 102 in order to determine relevancy of the contextual information. For each type of contextual information obtained (OCR, reverse image, and/or machine learning), confidence scores are generated. The confidence score for keywords and/or phrases can be based on frequency. For example, if a keyword is repeated several times across several frames in a batch of frames, it is more likely that the keyword or phrase is relevant. This can also be determined from a pre-searching of the Internet for matching content with those keywords.

If a reverse image search locates images from third party resources (or a local repository/knowledgebase as will be described herein) that have content that corresponds to the content found in a frame, the frame is considered to be relevant (e.g., likely to return a result when searching for supplementary content) and a higher confidence score would be returned, as opposed to instances where few or no images are found in a reverse image search (e.g., lower or no confidence score).

The machine learning process returns confidence scores based on a correspondence or matching of landmarks or features in the frames. Thus, this particular confidence score is based on how similar the features in the frames are to features available to the machine learning system. In one example embodiment, the Microsoft Azure™ platform can be utilized.

As noted above, each of the contextual evaluation processes can be used individually or in any combination and/or permutation. In one embodiment, all contextual evaluation processes are utilized in conjunction. Also, in instances where more than one type of contextual evaluation process is used, the data collection and analysis system 102 can apply a weighting to the individual contextual evaluation process. By way of non-limiting example, if the reverse image search is used and numerous images were found that were nearly identical to the frames used as input to the reverse image search, the data collection and analysis system 102 would provide the contextual information from the reverse image search with a score that would be 90 on a scale of zero to 100. If the machine learning process was only able to verify five percent of the features in the frames, the data collection and analysis system 102 might assign that contextual analysis process a relatively low score of 10 out of 100. Thus, the data collection and analysis system 102 weights the reverse image search higher than the machine learning process. If the confidence score is below a predetermined threshold, the data collection and analysis system 102 can exclude the analysis all together for the machine learning process. To be sure, each of the contextual analysis processes can be subject to scoring thresholds such as this. In other embodiments, the contextual information can be used in a raw format without any scoring or weighting.

In various embodiments, when multiple contextual analysis processes are used to generate multiple types of contextual information, an aggregated collection of contextual information is created. In some embodiments, the aggregated collection of contextual information can be stored in the contextual repository 104. The aggregated collection of contextual information can be stored along with the corresponding frames and/or media obtained from the source 106.

The contextual information is then utilized by the data collection and analysis system 102 as input to a network search (such as an Internet search using a search engine). The result of the network search comprises supplementary content that corresponds to the contextual information. In one embodiment, the supplementary content comprises assistive or explanatory video or textual content related to the video game that is obtained from the Internet rather than the video game on the gaming console. That is, in some embodiments, the supplementary content is understood to be derived from sources or repositories maintained by third parties, which are accessible through the Internet. For example, supplementary content could include a game-walkthrough hosted on a video game fan website or other similar sources. The data collection and analysis system 102 provides rich data mining to produce real-time links to guides, walkthroughs, videos, and more.

In some embodiments, the data collection and analysis system 102 can perform a second type of confidence scoring and/or weighting based on the supplementary content. This confidence scoring and/or weighting is indicative of how closely the supplementary content corresponds in content to the contextual information of the media. In other instances, the supplementary content is not scored but is taken in raw format from the results of the search performed.

The data collection and analysis system 102 formats the supplementary content into a consumable format that is provided to a requesting user. In some embodiments, the supplementary content is displayed on the source 106 in a GUI such as a dialogue frame or menu screen. The supplementary content can be displayed proximately to the game in an overlaid format or can be selected from a menu of options available through the video game. In another example embodiment, the supplementary content is transmitted to another device, such as UE 110 (also referred to as a receiving device). In some embodiments, the supplementary content is delivered to both the source 106 and the UE 110 or other device.

As mentioned above, the knowledgebase 108 is created as media is received, contextually extracted/analyzed, and supplementary content located in response to searching using the extracted contextual information. In some embodiments, the data collection and analysis system 102 can create metadata tags for frames/images or video determined from the contextually analysis/analyses performed thereon. Also, the supplementary content is associated with the frames/images or video through metadata tags or a record.

In one or more embodiments, game developers can also provide developer-created contextual data that is embedded into the video game directly or is provided into the knowledgebase 108 in a record or other suitable format. In some embodiments, the knowledgebase 108 is populated and refined using artificial intelligence. For example, when content is added to the knowledgebase 108, this seed or training data can be compared against trusted sources from third parties to determine the accuracy of the contextual analysis used when processing the media. The result of these processes is a rich, domain-specific data set that can be used in lieu of, or in addition to, the reverse image searching and machine learning feature detection processes described herein. The game developers utilize a specific application programming interface (API) to access the knowledgebase 108 and/or game development tools.

Figure 2:
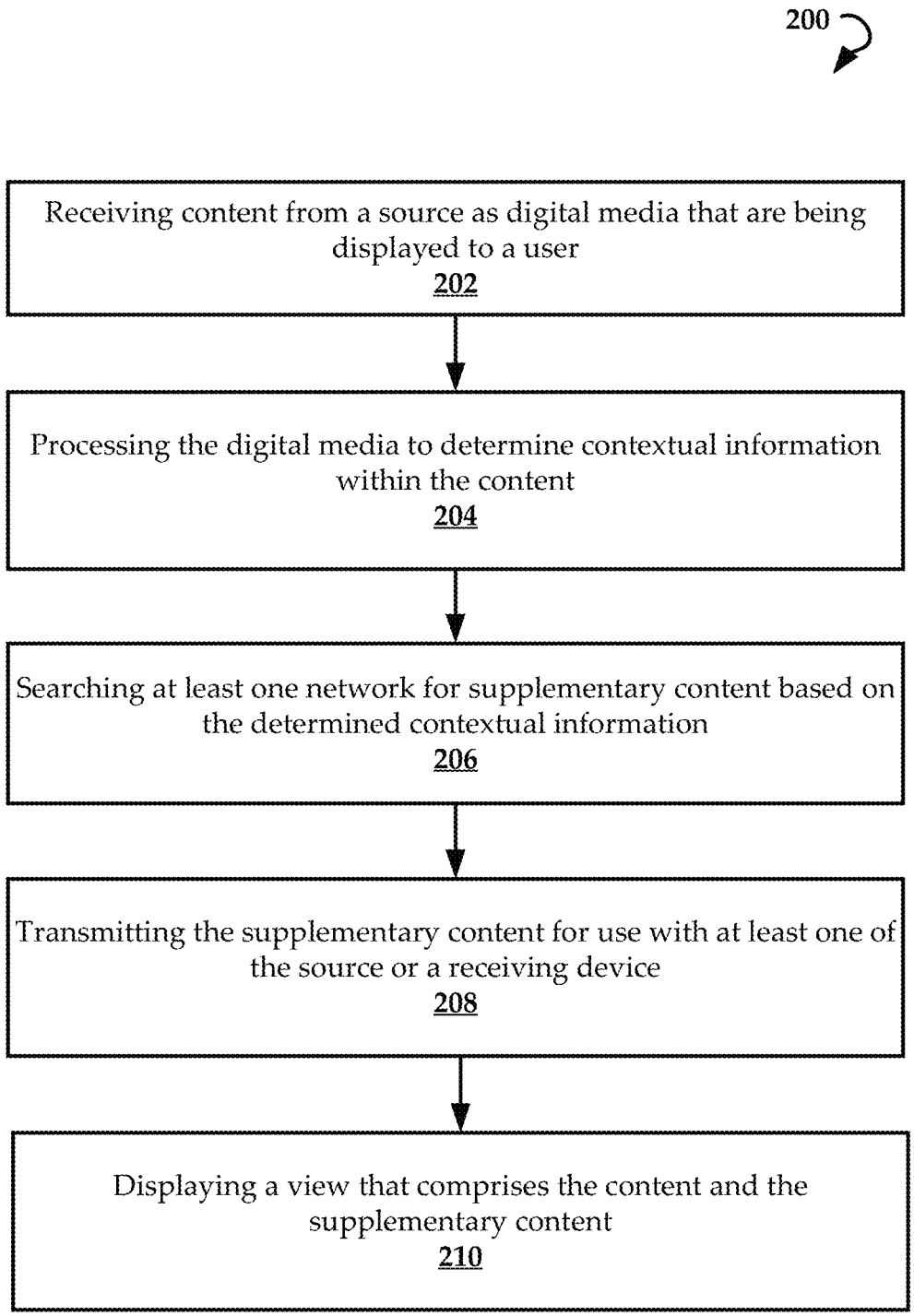
FIG. 2 is a flowchart of an example method of the present disclosure.

FIG. 2 illustrates a flowchart of an example method 200 of the present disclosure. In some embodiments, the method 200 includes a step 202 of receiving content from a source as digital media that are being displayed to a user. This can include, for example, receiving frames of images or video from a gaming console. The method 200 then includes a step 204 processing the digital media to determine contextual information within the content. As noted throughout, the processing can include a plurality of types of contextual processing such as OCR, reverse image search, and machine learning for feature detection. When contextual information is determined, the method 200 includes a step 206 of searching at least one network for supplementary content based on the determined contextual information. As noted above, this could include searching a local knowledgebase if available. Once supplementary content is found, the method 200 includes a step 208 transmitting the supplementary content for use with at least one of the source or a receiving device.

In some instances, the method 200 can include an optional step 210 of displaying a view that comprises the content and the supplementary content. The supplementary content is overlaid or presented within a frame of a graphical user interface.

In some embodiments, the receiving device comprises a mobile communications device that executes a supplementary content application (e.g., client-side application) that displays the supplementary content in a GUI.

In various embodiments, the source comprises a gaming console and content that is continually updated and stored in a contextual repository. In some embodiments, the source supplies a title or other contextual information for the video game. If developers have embedded contextual information in the video game, this contextual information can be supplied by the source during gameplay.

As noted above, this method is amenable for use with any image or video media in order to determine contextual information and return rich supplementary information about the media based on the contextual information.

Figure 3:
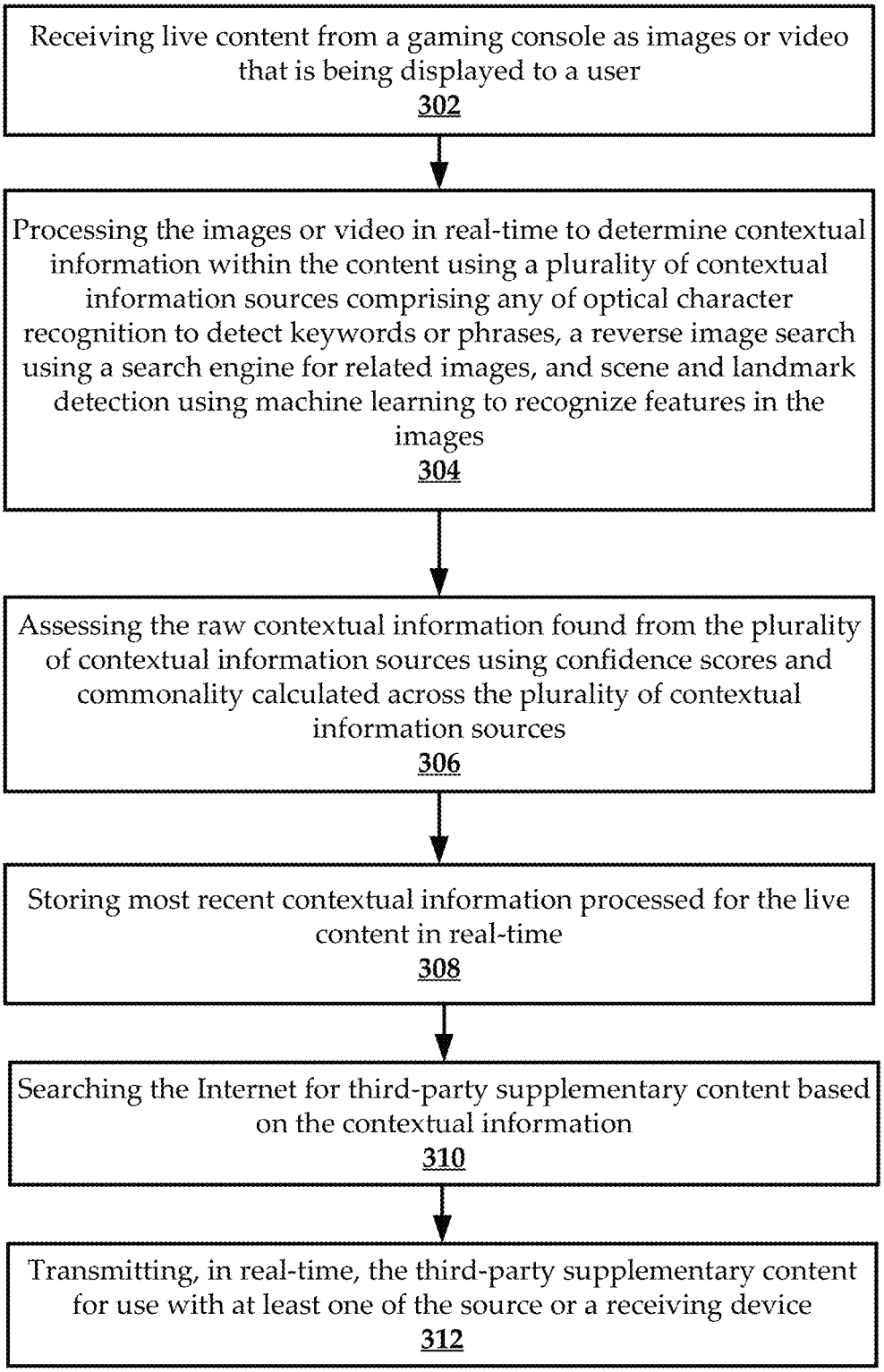
FIG. 3 is a flowchart of an example method of the present disclosure.

FIG. 3 is a flowchart of a more detailed example method 300 of the present disclosure. The method 300 includes a step 302 of receiving live content from a gaming console as images or video that is being displayed to a user. In some embodiments, the method 300 includes a step 304 of processing the images or video in real-time to determine contextual information within the content using a plurality of contextual information sources comprising any of optical character recognition to detect keywords or phrases, a reverse image search using a search engine for related images, and scene and landmark detection using machine learning to recognize features in the images.

This method 300 can include a step 306 of assessing the raw contextual information found from the plurality of contextual information sources using confidence scores and commonality calculated across the plurality of contextual information sources.

In some embodiments, the method 300 includes a step 308 of storing most recent contextual information processed for the live content in real-time. The most recent contextual information is stored in memory of a contextual repository, such that the most recent contextual information changes as the images or video changes (e.g., continual updating).

Next, the method 300 includes a step 310 of searching the Internet for third-party supplementary content based on the contextual information, and a step 312 of transmitting, in real-time, the third-party supplementary content for use with at least one of the source or a receiving device.

Figure 4:
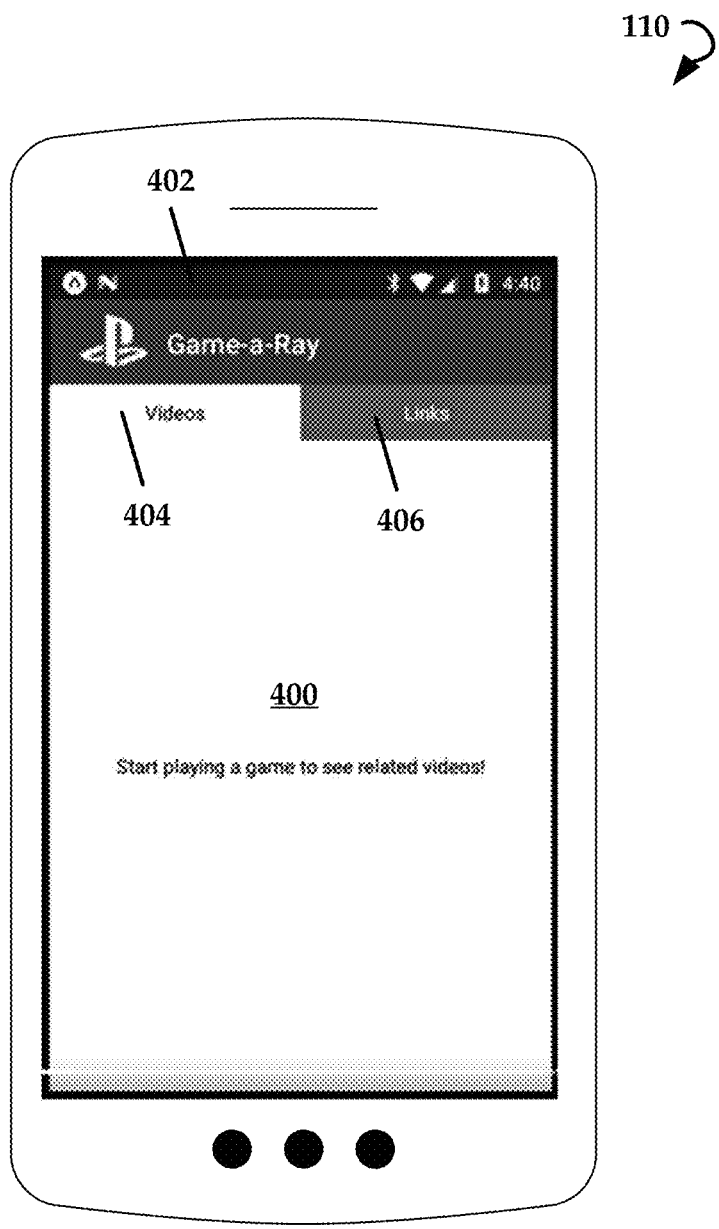
FIG. 4 illustrates an example user equipment (hereinafter, "UE") displaying a graphical user interface (hereinafter "GUI") in accordance with embodiments of the present disclosure.

FIGS. 1 and 4 collectively illustrate an example GUI 400 displayed on the UE 110. Again, the UE 110 executes a client-side application 402 that allows the data collection and analysis system 102 to transmit GUIs and feeds to the UE 110. In some embodiments, the GUI 400 includes a links tab 406 and a videos tab 404. The links tab 406 includes URL links to supplementary content, such as written tutorials or articles. The videos tab 404 includes links or pointers to media content, such as videos that are also determined to be supplementary content.

When the user initially launches the client-side application 402, the GUI 400 is empty. The GUI 400 can include a message that informs the user to begin playing the video game. A method of linking source 106 and UE 110 is provided such that the system 100 would know that a mobile device/application that is open (e.g., client-side application 402) is linked to a specific gaming console (e.g., UE 110) that is generating a video feed. An example of such a method includes source 106 and GUI 400 being authenticated using the same user account against a centralized authentication system. This would allow system 100 to associate the source 106 and GUI 400 with one another. Another example of such a method includes GUI 400 allowing a user to enter a code that is generated on source 106. This would also allow system 100 to associate the source 106 and GUI 400 with one another.

Figure 5A:
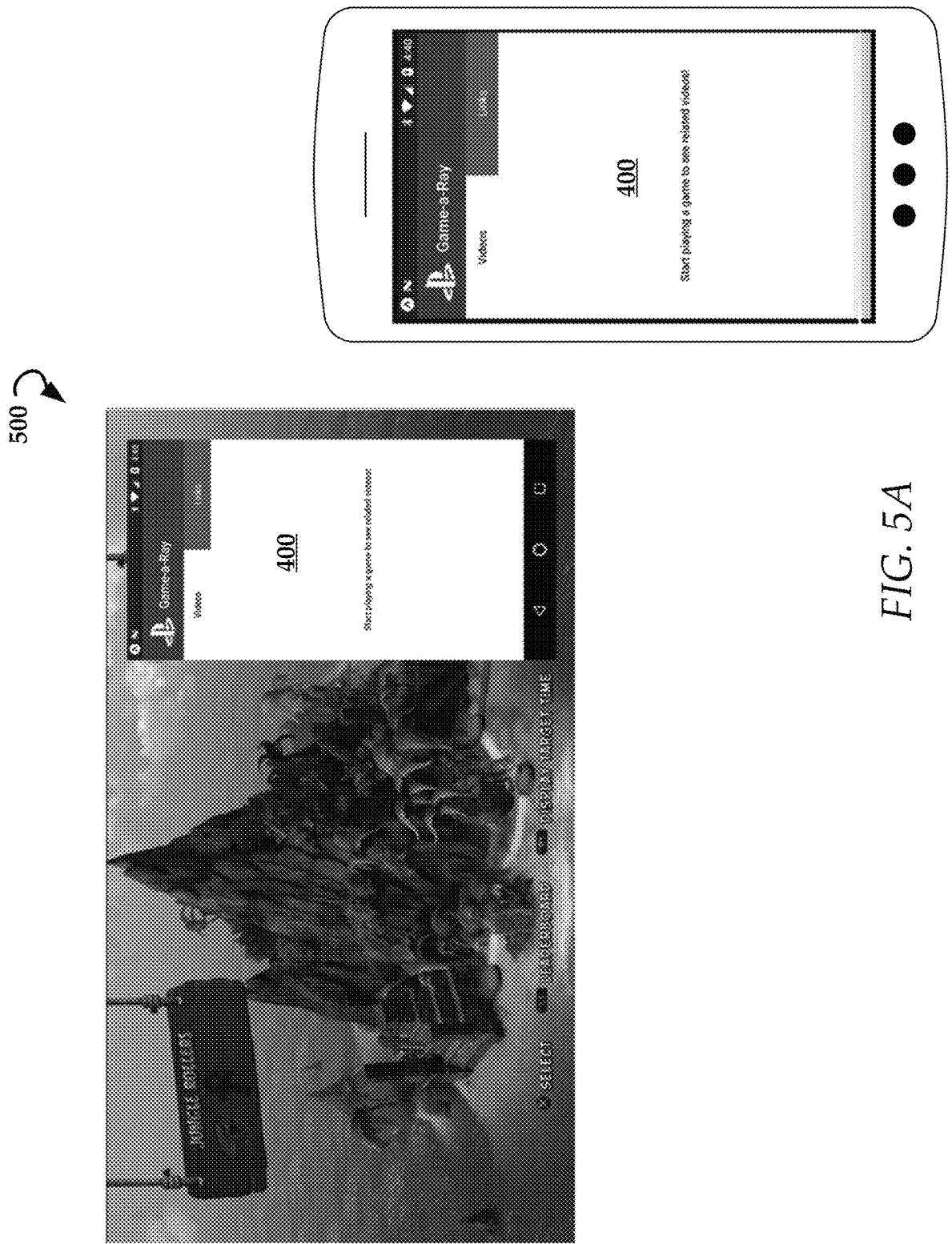
FIG. 5A illustrates a screenshot of a video game with a GUI overlay and corresponding GUI displayed in a UE.
Figure 5B:
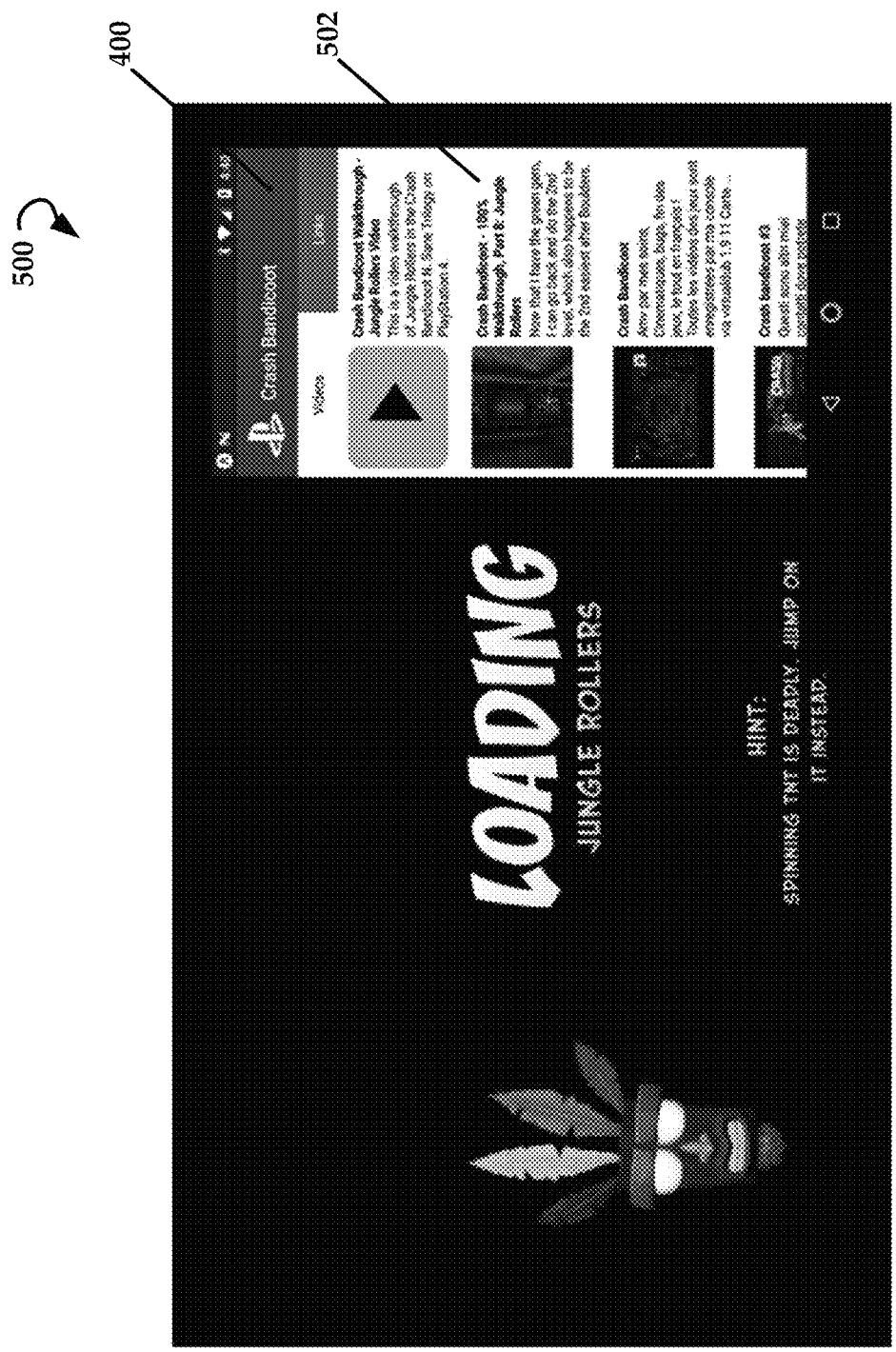
FIG. 5B illustrates a screenshot of the video game and the updating of the GUI overlay.

FIG. 5A illustrates the overlay of the GUI 400 on top of a display of a video game 500. The GUI 400 can also be illustrated on a UE as illustrated as well. As noted above, the video game 500 can be displayed by itself by the gaming console while the GUI 400 is illustrated on the UE. The frame of the video game 500 illustrated is from a main menu screen of a video game. As the game progresses, the video game 500 in FIG. 5B may include text such as a title or level name (e.g., "Jungle Rollers") and images (e.g., a tiki character). These types of contextual information found in frames generated by the gaming console inform the system to begin contextual analysis and supplementary content generation for the GUI 400.

In this example, the title of the game "Crash Bandicoot" is determined from the contextual information and is noted in the header of the GUI 400. Video links such as a walkthrough video 502 are placed into the GUI 400.

Figure 5C:
FIGS. 5C and 5D collectively illustrate screenshots of the video game and the GUI overlay as gameplay occurs.
Figure 5D:

FIGS. 5C and 5D collectively illustrate the updating of the GUI 400 based on progressions in gameplay of the video game 500, with FIG. 5C specifically illustrating new videos in the GUI 400 and FIG. 5D illustrating new links in the GUI 400 under the links tab.

Figure 6A:
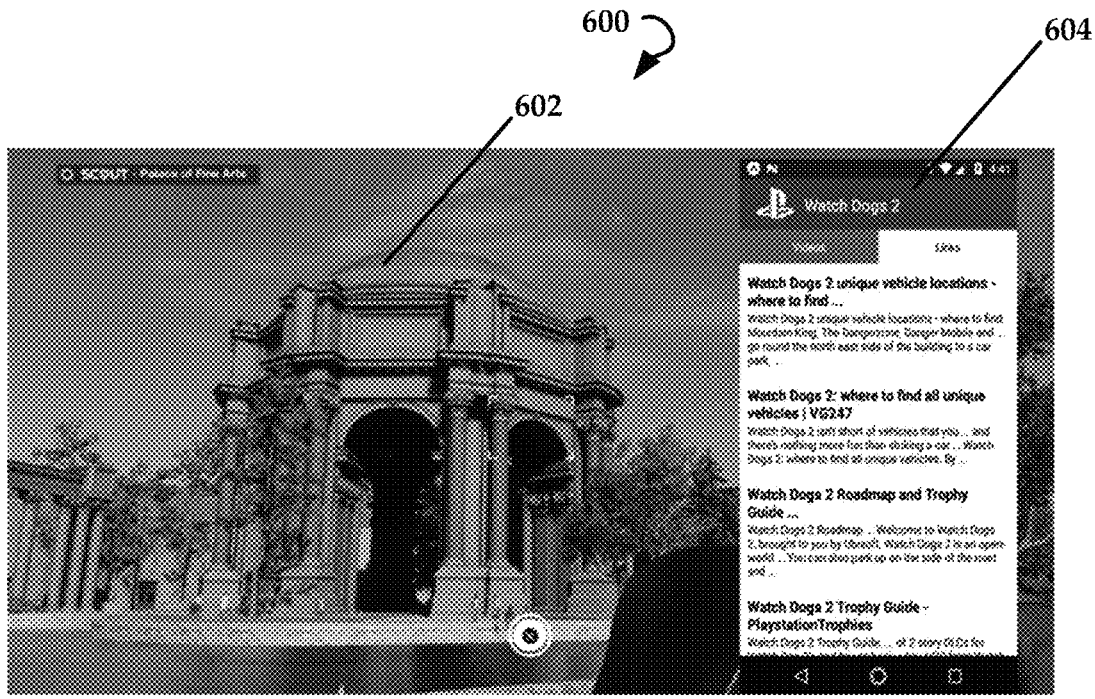
FIGS. 6A and 6B collectively illustrate feature detection used to generate supplementary content in a GUI overlaid on a video game display or in a UE through an application.
Figure 6B:
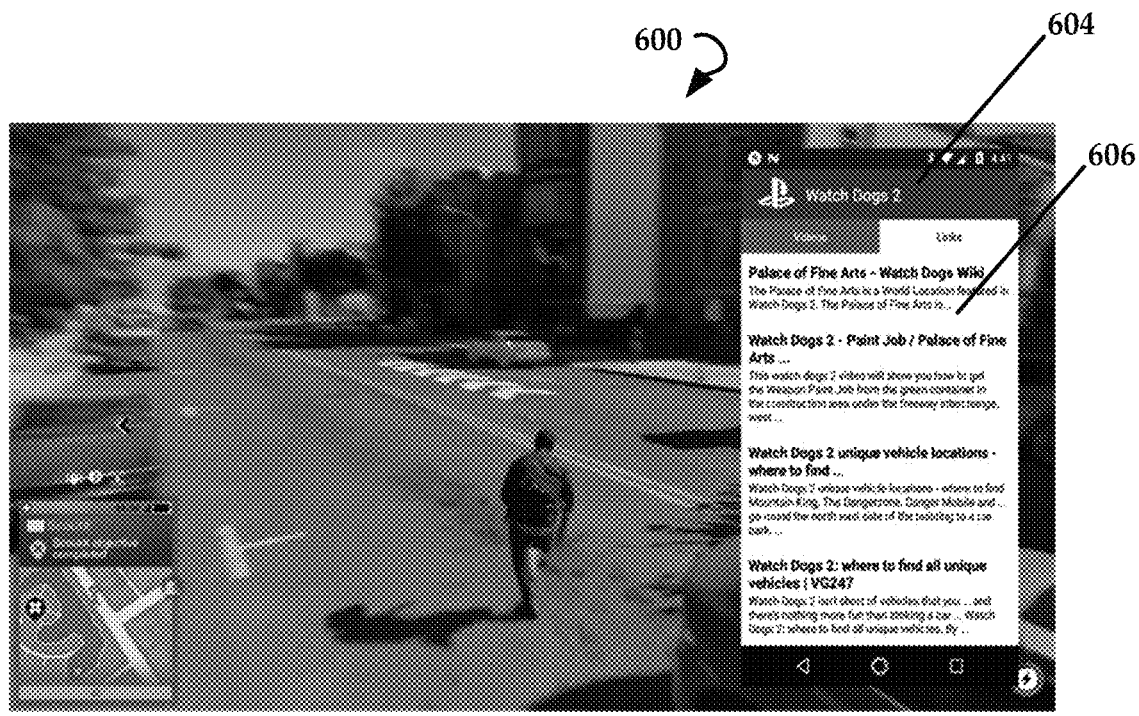

FIGS. 6A and 6B collectively illustrate another example of contextual analysis of landmarks in a video game and the consequent display of supplementary content related to the landmark. For example, the video game 600 includes a landmark 602 of the Palace of Fine Arts. The machine learning recognizes this feature as contextual information and the system generates updates a GUI 604 to include links to supplementary content regarding the Palace of Fine Arts, such as a URL for a wiki entry 606. As is illustrated and described, the real-time nature of the contextual analysis and resulting provision of supplementary content provides for a dynamic and rich user experience.

Figure 7:
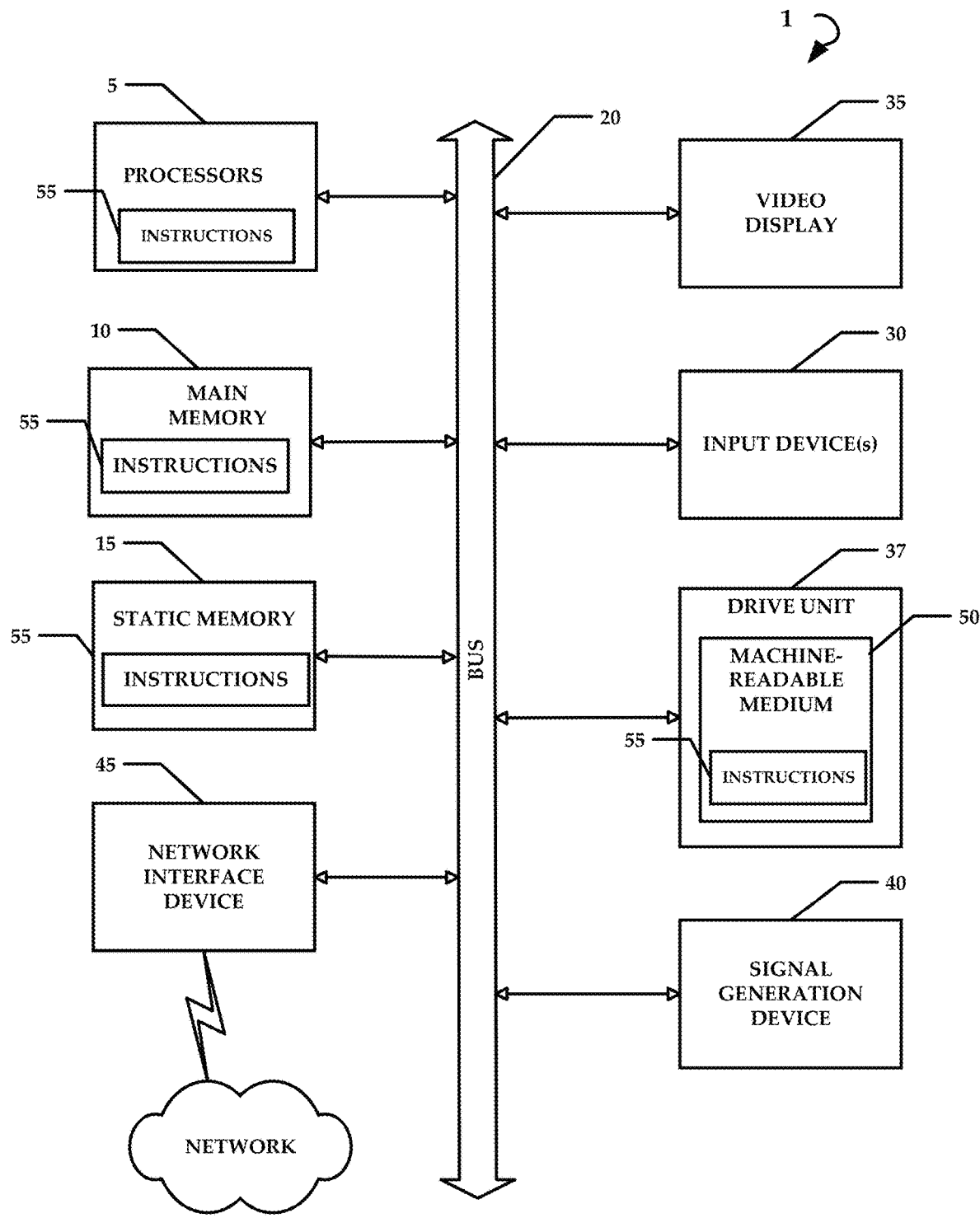
FIG. 7 is a schematic diagram of an example computer device that can be utilized to implement aspects of the present technology.

FIG. 7 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be, for example, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within static memory 15 and/or within the processors 5 during execution thereof by the computer system 1. The main memory 10, static memory 15, and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure. For example, the technology is not limited to use for stopping email threats, but applies to any messaging threats including email, social media, instant messaging, and chat.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method, comprising:
receiving a digital media capture of a live media content from a user, the digital media capture being submitted by the user on a source device, the source device being communicatively coupled with a display medium, the source device operating to generate a visual display and a user interface on the display medium;
processing the digital media capture to determine contextual information within the live media content, the processing comprising analyzing the digital media capture to extract the contextual information from the live media content by:
timestamping a series of frames of the digital media capture;
performing a reverse image search of the timestamped series of frames using a search engine;
performing one or more of a scene detection, a discrete feature detection, and landmark detection of the timestamped series of frames, said detections using machine learning;
applying a weighting to results of each of the reverse image search and results of performed said detections, the weighting based on a predetermined value assigned to a type of contextual evaluation process;
generating a batch of contextual information over a timeframe; and
performing a first assessment, the first assessment being of contextual information of the batch of contextual information for relevancy using an aggregate of confidence scores and commonality calculated across a plurality of contextual information sources, the aggregate of confidence scores comprising a first confidence score based on frequency of groups of textual data detected by optical character recognition, a second confidence score associated with images identified based on the reverse image search, and a third confidence score associated with one or more features recognized in the digital media capture based on the machine learning;
performing a search of at least one network for supplementary content based on the contextual information of the batch of contextual information extracted from the digital media capture, the search using a search input, the search input being determined by the first assessment;
transmitting the supplementary content to the source device; and
generating, by the source device, an updated visual display, the updated visual display comprising the live media content and an overlay, the overlay comprising the supplementary content.

2. The method according to claim 1, wherein the source device comprises a gaming console.

3. The method according to claim 1, wherein processing the digital media capture to determine contextual information that is indicative of the live media content further comprises performing optical character recognition on the digital media capture to detect keywords or phrases.

4. The method according to claim 1, further comprising receiving a title for the live media content from the source device.

5. The method of claim 1, further comprising searching, based on the contextual information, a knowledgebase for the supplementary content.

6. The method of claim 1, further comprising receiving, from the user, a query associated with the image or video content, wherein the determining the contextual information and the searching for the supplementary content are initiated in response to the query.

7. The method of claim 1, further comprising performing a second assessment, the second assessment being of the results of the search, the second assessment using confidence scoring to determine how closely the supplementary content corresponds to the contextual information of the batch of contextual information.

8. The method of claim 1, wherein the overlay is a dialogue frame or a menu screen.

9. A method, comprising:
receiving a live content capture from a gaming console, the live content capture comprising images or video that are being displayed to a user on a display device communicatively coupled to the gaming console;
processing the images or video in real time, the processing comprising:
analyzing the live content capture to extract contextual information from the live content capture using a plurality of contextual information sources comprising any of optical character recognition to detect keywords or phrases, a reverse image search using a search engine for related images, one or more of a scene detection, a discrete feature detection, and a landmark detection, said detections using machine learning to recognize features in the images or video;
timestamping a series of frames of the images or video;
applying a weighting to results of each of the reverse image search and results of performed said detections, the weighting based on a predetermined value assigned to a type of contextual evaluation process; and
generating a batch of contextual information over a defined timeframe;
storing a most recent batch of contextual information processed for the live content capture in real time, the most recent batch of contextual information being stored in memory of a contextual repository, wherein the most recent batch of contextual information changes as the images or video change;
performing a first assessment, the first assessment being of contextual information of the batch of contextual information for relevancy using an aggregate of confidence scores and commonality calculated across the plurality of contextual information sources, the aggregate of confidence scores comprising a first confidence score based on frequency of groups of textual data detected by optical character recognition, a second confidence score associated with images identified based on the reverse image search, and a third confidence score associated with one or more features recognized in the live content capture based on the machine learning;

searching the Internet for a third-party supplementary content based using a search input, the search input being determined by the first assessment;

transmitting, in real time, the third-party supplementary content to the gaming console; and generating, by the gaming console, an updated visual display, the updated visual display comprising the live content capture and an overlay, the overlay comprising the supplementary content.

10. The method according to claim 9, further comprising storing the contextual information and the supplementary content found during the search in a knowledgebase.

11. The method according to claim 9, wherein the live content capture comprises a video game and the supplementary content comprises assistive or explanatory video or textual content related to the video game.

12. The method of claim 9, further comprising receiving, from the user, a query associated with the image or video content, wherein the extracting the contextual information and the searching for the third-party supplementary content are initiated in response to the query.

13. The method of claim 9, further comprising performing a second assessment, the second assessment being of the results of the search, the second assessment using confidence scoring to determine how closely the supplementary content corresponds to the contextual information of the batch of contextual information.

14. A system, comprising:

a processor; and a memory communicatively coupled to the processor, the memory storing instruction executable by the processor to perform a method comprising:

receiving a digital media capture of live media as image or video content from a source device, the source device being communicatively coupled with a display medium, the source device operating to generate a visual display and a user interface on the display medium;

analyzing the digital media capture to extract contextual information from the digital media capture by processing the image or video content using a plurality of contextual information sources comprising any of optical character recognition to detect keywords or phrases, a reverse image search using a search engine for related images, one or more of a scene detection, a discrete feature detection, and a landmark detection, said detections using machine learning to recognize features in the image or video content, timestamping a series of frames of the image or video content, applying a weighting to results of each of the reverse image search and results of performed said detections, the weighting based on a predetermined value assigned to a type of contextual evaluation process, and generating a batch of contextual information over a timeframe;

performing an assessment, the assessment being of contextual information of the batch of contextual information for relevancy using an aggregate of confidence scores and commonality calculated across the plurality of contextual information sources, the aggregate of confidence scores comprising a first confidence score based on frequency of groups of textual data detected by optical character recognition, a second confidence score associated with images identified based on the reverse image search, and a third confidence score associated with one or more features recognized in the digital media capture based on the machine learning;

searching at least one network for supplementary content using a search input, the search input being determined by the assessment;

transmitting the supplementary content to the source device;

generating, by the source device, an updated visual display, the updated visual display comprising the image or video content and an overlay, the overlay comprising the supplementary content; and storing the image or video content, the contextual information of the batch of contextual information, and the supplementary content.

15. The system according to claim 14, further comprising a knowledgebase that stores the contextual information and the supplementary content.

16. The system according to claim 14, further comprising storing the contextual information and the supplementary content found during the search in a knowledgebase.

17. The system according to claim 14, wherein the source device comprises a console and content that is being continually updated and stored in a contextual repository.

18. The system according to claim 17, wherein the content comprises a video game and the supplementary content comprises assistive or explanatory video or textual content related to the video game that is obtained from the Internet rather than the video game on the console.

19. The system of claim 14, wherein the processor is further configured to search, based on the contextual information, a knowledgebase for the supplementary content.

20. The system of claim 14, wherein the processor is further configured to receive, from a user, a query associated with the image or video content, wherein the extracting the contextual information and the searching for the supplementary content are initiated in response to the query.

* * * * *